US009143697B2

(12) United States Patent
Weaver

(10) Patent No.: US 9,143,697 B2
(45) Date of Patent: Sep. 22, 2015

(54) LIGHTING AND CONTROL SYSTEMS AND METHODS

(71) Applicant: Lumenetix, Inc., Scotts Valley, CA (US)

(72) Inventor: Matthew D. Weaver, Aptos, CA (US)

(73) Assignee: LUMENETIX, INC., Scotts Valley, CA (US)

( * ) Notice: Subject to any disclaimer, the term of this patent is extended or adjusted under 35 U.S.C. 154(b) by 150 days.

(21) Appl. No.: 13/848,628

(22) Filed: Mar. 21, 2013

(65) Prior Publication Data

US 2013/0214687 A1 Aug. 22, 2013

Related U.S. Application Data

(63) Continuation of application No. 12/396,399, filed on Mar. 2, 2009, now Pat. No. 8,442,403.

(60) Provisional application No. 61/032,993, filed on Mar. 2, 2008.

(51) Int. Cl.
*H04N 5/00* (2011.01)
*H04N 5/235* (2006.01)
(Continued)

(52) U.S. Cl.
CPC ......... *H04N 5/2351* (2013.01); *H05B 33/0845* (2013.01); *H05B 33/0854* (2013.01); *H05B 37/0272* (2013.01)

(58) Field of Classification Search
CPC ............. H04N 5/2351; H05B 33/0845; H05B 33/0854; H05B 37/0272

USPC .................................................. 398/115–117
See application file for complete search history.

(56) References Cited

U.S. PATENT DOCUMENTS 5,099,348 A 3/1992 Huddleston et al.
5,109,222 A 4/1992 Welty
(Continued)

FOREIGN PATENT DOCUMENTS

JP 2005-011628 A 1/2005
JP 2006-059605 A 3/2006
(Continued)

OTHER PUBLICATIONS

Non-Final Office Action Mailed Sep. 23, 2011 in Co-Pending U.S. Appl. No. 12/396,399 of Weaver, M., filed Mar. 2, 2009.
(Continued)

*Primary Examiner* — Danny Leung
(74) *Attorney, Agent, or Firm* — Perkins Coie LLP

(57) ABSTRACT

Lighting and control systems and methods for a lighting node and a remote control device are disclosed. The remote control device may be coupled to the lighting node via an identification process, such as broadcasting an identification request from the remote control device to nearby lighting nodes. The lighting node can respond to the identification request by sending an identifier to the remote control device such that future commands sent from the remote control device is limited to be responded by the lighting node having the identifier stored thereon. Once coupled, the remote control device can adjust spectral content produced by the lighting node based on user-configuration or a color profile captured via an optical sensor. The adjustment via the remote control device may further include calibration and recalibration of the lighting node utilizing a feedback mechanism with the optical sensor.

12 Claims, 8 Drawing Sheets

(51) Int. Cl.
*H05B 37/02* (2006.01)
*H05B 33/08* (2006.01)

(56) References Cited

U.S. PATENT DOCUMENTS

| | | | |
|---|---|---|---|
| 5,457,478 | A | 10/1995 | Frank |
| 6,128,117 | A | 10/2000 | Kim |
| 6,323,980 | B1* | 11/2001 | Bloom .......................... 398/129 |
| 6,411,046 | B1 | 6/2002 | Muthu |
| 7,423,387 | B2 | 9/2008 | Robinson |
| 8,294,374 | B2 | 10/2012 | Colak et al. |
| 8,594,505 | B2 | 11/2013 | Weaver |
| 2002/0097000 | A1 | 7/2002 | Muthu et al. |
| 2002/0114155 | A1 | 8/2002 | Katogi et al. |
| 2004/0008992 | A1 | 1/2004 | Nishimura |
| 2004/0105264 | A1* | 6/2004 | Spero .......................... 362/276 |
| 2005/0030744 | A1 | 2/2005 | Ducharme et al. |
| 2005/0047134 | A1 | 3/2005 | Mueller et al. |
| 2005/0128751 | A1 | 6/2005 | Roberge et al. |
| 2007/0183163 | A1 | 8/2007 | Daniel |
| 2007/0248047 | A1 | 10/2007 | Shorty et al. |
| 2008/0191631 | A1 | 8/2008 | Archenhold et al. |
| 2009/0040750 | A1 | 2/2009 | Myer |
| 2009/0184648 | A1* | 7/2009 | Colak et al. ................... 315/158 |
| 2009/0218951 | A1 | 9/2009 | Weaver |
| 2009/0267524 | A1 | 10/2009 | Draaijer et al. |
| 2010/0110672 | A1 | 5/2010 | Durand et al. |
| 2010/0188004 | A1 | 7/2010 | Baggen et al. |
| 2010/0231363 | A1 | 9/2010 | Knibbe |
| 2010/0244746 | A1 | 9/2010 | Van De Sluis et al. |
| 2010/0301776 | A1 | 12/2010 | Feri et al. |
| 2011/0044701 | A1 | 2/2011 | Schenk et al. |

FOREIGN PATENT DOCUMENTS

| | | |
|---|---|---|
| WO | WO-02/13490 A2 | 2/2002 |
| WO | WO-02/47438 A2 | 6/2002 |
| WO | WO-02/082283 A2 | 10/2002 |
| WO | WO-02/082863 A1 | 10/2002 |
| WO | WO-03/055273 A2 | 7/2003 |
| WO | WO-2004/057927 A1 | 7/2004 |
| WO | WO-2006/111934 A1 | 10/2006 |
| WO | WO-2007/125477 A2 | 11/2007 |

OTHER PUBLICATIONS

Final Office Action Mailed Dec. 5, 2012 in Co-Pending U.S. Appl. No. 12/396,399 of Weaver, M., filed Mar. 2, 2009.

Co-Pending U.S. Appl. No. 12/396,399 of Weaver, M., filed Mar. 2, 2009.

Co-Pending U.S. Appl. No. 13/627,926 of Weaver, M., filed Sep. 26, 2012.

Co-Pending U.S. Appl. No. 13/655,679 of Weaver, M.D., filed Oct. 19, 2012.

Co-Pending U.S. Appl. No. 13/655,738 of Weaver, M.D., filed Oct. 19, 2012.

Non-Final Office Action Mailed Dec. 4, 2012 in Co-Pending U.S. Appl. No. 13/627,926 of Weaver, M.D., filed Sep. 26, 2012.

Non-Final Office Action Mailed Jan. 4, 2013 in Co-Pending U.S. Appl. No. 12/396,399 of Weaver, M., filed Mar. 2, 2009.

Notice of Allowance Mailed Mar. 20, 2013 in Co-Pending U.S. Appl. No. 12/396,399 of Weaver, M., filed Mar. 2, 2009.

Non-Final Office Action Mailed Feb. 28, 2013 in Co-Pending U.S. Appl. No. 13/655,738 of Weaver, M.D., filed Oct. 19, 2012.

Co-Pending U.S. Appl. No. 12/782,038 of Weaver, M. et al., filed May 18, 2010.

Co-Pending U.S. Appl. No. 13/367,187 of Weaver, M.D., filed Feb. 6, 2012.

Co-Pending U.S. Appl. No. 13/766,695 of Bowers, D. et al., filed Feb. 13, 2013.

Co-Pending U.S. Appl. No. 13/766,707 of Bowers, D., filed Feb. 13, 2013.

Co-Pending U.S. Appl. No. 13/766,745 of Bowers, D. et al., filed Feb. 13, 2013.

Co-Pending U.S. Appl. No. 13/770,595 of Weaver, M.D., filed Feb. 19, 2013.

Restriction Requirement mailed Mar. 25, 2013 for Co-Pending U.S. Appl. No. 12/782,038 of Weaver, M., filed May 18, 2010.

International Search Report mailed Dec. 28, 2010, for International Patent Application No. PCT/2010/035295 filed May 18, 2010, pp. 1-8.

Written Opinion mailed Dec. 28, 2010, for International Patent Application No. PCT/2010/035295 filed May 18, 2010, pp. 1-5.

Non-Final Office Action mailed Dec. 5, 2013, for Co-Pending U.S. Appl. No. 12/782,038 by Weaver, M., filed May 18, 2010.

Notice of Allowance mailed May 13, 2014, for Co-Pending U.S. Appl. No. 12/782,038 by Weaver, M., filed May 18, 2010.

Non-Final Office Action Mailed Mar. 11, 2014, in Co-Pending U.S. Appl. No. 13/655,679 by Weaver, M.D., filed Oct. 19, 2012.

Notice of Allowance Mailed Mar. 14, 2014, in Co-Pending U.S. Appl. No. 13/655,738 by Weaver, M.D., filed Oct. 19, 2012.

\* cited by examiner

LIGHTING AND CONTROL SYSTEMS AND METHODS

CLAIM OF PRIORITY

This application is a Continuation Application of U.S. patent application Ser. No. 12/396,399, filed on Mar. 2, 2009 and entitled "LIGHTING AND CONTROL SYSTEMS AND METHODS", which claims priority to U.S. Provisional Patent Application No. 61/032,993 entitled "MECHANISMS FOR CONTROLLING LIGHT MIXING USING REMOTES," which was filed on Mar. 2, 2008, the contents of which are expressly incorporated by reference herein.

BACKGROUND

Conventional systems for controlling lighting in homes and other buildings suffer from many drawbacks. One such drawback is that such systems rely on conventional lighting technologies, such as incandescent bulbs and fluorescent bulbs. Such lamps are limited in many respects. For example, such lamps typically do not offer long life or high energy efficiency. Further, such lamps offer only a limited selection of colors, and what colors are offered are typically not well specified. Further still, the color or light output of such lamps typically changes or degrades over time as the lamp ages. Additionally, after such lamps are installed in a particular location in a home or other building, a user must return to the location and physically inspect the lamp to learn its operational condition. In buildings having a large number of lamps, such inspections can become tedious.

Another drawback of conventional systems is that such systems typically have inflexible controls. For example, the controls in such systems in many instances are limited to simple on-off switches, or manually controlled dimming switches. Such switches provide only limited control over lamps. Further, the relationships between conventional switches and the lamps each switch controls are not readily apparent. Thus, a user must experiment with multiple switches before determining which switch controls the lamp he or she wants to affect. Another issue with conventional switches is that they typically do not provide highly granular control. Thus, multiple lamps may be controlled by a single switch, thereby further limiting a user's control choices. Conversely, if a user wants highly centralized control, he or she may be frustrated that by utilizing a particular switch he or she can only control all of the lights in a room, for example, instead of all of the lights in a home or other building. Thus, conventional switches can frustrate user expectations in multiples ways.

The foregoing examples of the related art and limitations related therewith are intended to be illustrative and not exclusive. Other limitations of the related art will become apparent upon a reading of the specification and a study of the drawings.

SUMMARY

One embodiment of a lighting and control system includes a lighting node and a remote control device. The remote control device can be coupled to the lighting node via an identification process. An example of the identification process includes broadcasting an identification request from the remote control device to nearby lighting nodes. The lighting node can respond to the identification request by sending an identifier to the remote control device. For example, the identifier is stored on the remote control device such that commands sent from the remote control device is limited to be responded by the lighting node having the identifier stored on a memory device of the lighting node. Once coupled, the remote control device can adjust spectral content produced by the lighting node based on user-configuration or a color profile. In one example, the color profile is saved on the remote control device by capturing a color composition via an optical sensor on the remote control device. The adjustment via the remote control device may further include calibration and recalibration of the lighting node utilizing a feedback mechanism with the optical sensor of the remote control device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Described in detail below are lighting and control systems and methods.

Various aspects of the invention will now be described. The following description provides specific details for a thorough understanding and enabling description of these examples. One skilled in the art will understand, however, that the invention may be practiced without many of these details. Additionally, some well-known structures or functions may not be shown or described in detail, so as to avoid unnecessarily obscuring the relevant description. Although the diagrams depict components as functionally separate, such depiction is merely for illustrative purposes. It will be apparent to those skilled in the art that the components portrayed in this figure may be arbitrarily combined or divided into separate components.

The terminology used in the description presented below is intended to be interpreted in its broadest reasonable manner, even though it is being used in conjunction with a detailed description of certain specific examples of the invention. Certain terms may even be emphasized below; however, any terminology intended to be interpreted in any restricted manner will be overtly and specifically defined as such in this Detailed Description section.

Figure 1:
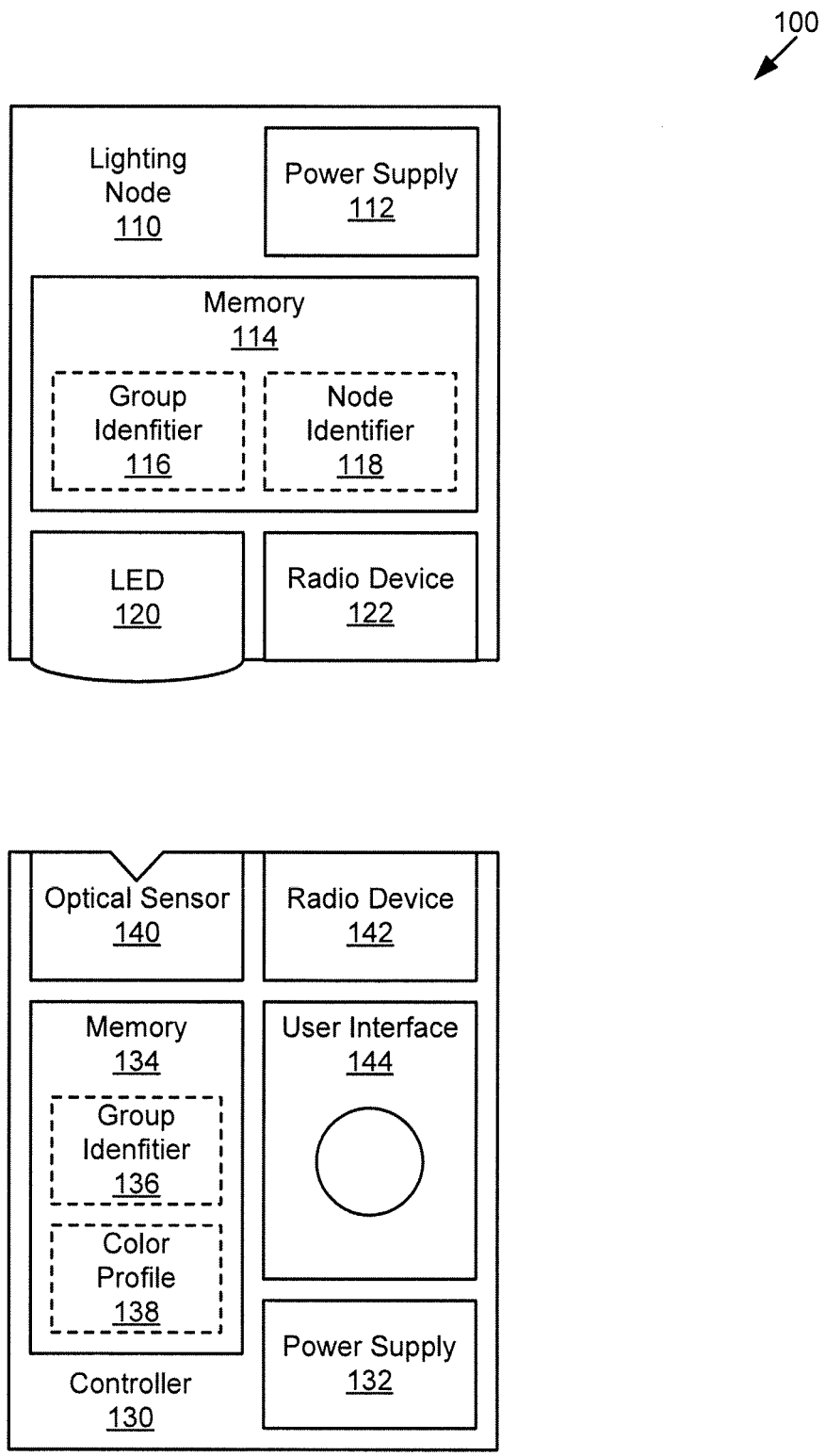
FIG. 1 depicts a block diagram of a lighting and control system according to an embodiment of the invention.

FIG. 1 depicts a block diagram of lighting and control system 100 according to one embodiment of the invention. Lighting and control system 100 comprises lighting node 110 and controller 130. Lighting node 110 comprises power supply 112, memory 114, light emitting diode ("LED") 120, and radio device 122. Controller 130 comprises power supply 132, memory 134, optical sensor 140, and radio device 142. Lighting and control system 100 can be located in a home or other building, for example, to provide a highly configurable and precise lighting experience with fundamentally elegant user control. A user may utilize controller 130 to control lighting node 110 according to the invention, as discussed below.

Lighting node 110 comprises LED 120, which in various embodiments includes different configurations of lamps. For example, in some embodiments LED 120 includes one LED or a plurality of LEDs. In embodiments wherein LED 120 includes a plurality of LEDs, the LEDs may be configured to emit light of a single color or of a uniform spectrum, or alternatively several of the LEDs may be configured to emit light of varying colors, or having different spectrums. In various embodiments wherein LED 120 includes a plurality of LEDs, the LEDs may be configured to emit light in one direction or in several directions. For example, in FIG. 1 LED 120 is configured to shine generally downward from lighting node 110, but in other embodiments LED 120 might be, for example, unidirectional or omnidirectional. In further various embodiments wherein LED 120 includes a plurality of LEDs, the LEDs may be electrically coupled in series, in parallel, or in various combinations of both. LED 120 includes, in one embodiment, a driver circuit for powering the one or more LEDs of LED 120. Notably, some embodiments utilize lamps other than LEDs. Thus, some embodiments utilize incandescent bulbs, fluorescent bulbs, or yet other kinds of lamps or lighting techniques. LED 120 is configured both for illumination and for optical communication with optical sensor 140 of controller 130, as discussed further below.

Lighting node 110 also comprises radio device 122, which in various embodiments includes different kinds of wireless devices. For example, in some embodiments radio device 122 is a radio receiver for receiving radio transmissions, while in other embodiments radio device 122 is a radio transceiver for sending and receiving radio transmissions. Further, radio device 122 may be implemented to operate as, for example, an analog or digital radio, a packet-based radio, an 802.11-standard radio, a Bluetooth radio, or a wireless mesh network radio. Further still, in some embodiments of the invention radio device 122 may be implemented to operate as wireline device, such as a communication-over-powerline device, a USB device, an Ethernet device, or another device for communicating over a wired medium. Radio device 122 may be configured for radio communication with radio device 142 of controller 130, as discussed further below.

Lighting node 110 also comprises memory 114, which in various embodiments includes different kinds of memory devices. For example, in some embodiments memory 114 is a volatile memory, while in other embodiments memory 114 is a nonvolatile memory. Memory 114 may be implemented as, for example, a random access memory, a sequential access memory, a FLASH memory, or a hard drive, for example. Memory 114 is configured to store group identifier 116 and node identifier 118. Additionally, memory 114 can be configured to store a color profile (not shown) for LED 120. In one embodiment, node identifier 118 can be configured to uniquely identify lighting node 110, while group identifier 116 can be configured to identify a group of lighting nodes including node 110, as discussed further below.

Lighting node 110 also comprises power supply 112, which in various embodiments includes different kinds of power supply hardware. For example, in some embodiments power supply 112 is a battery power supply, while in other embodiments power supply 112 is coupled to an external power supply. In embodiments wherein power supply 112 is coupled to an external power supply, power supply 112 may include a transformer or other power conditioning device. Power supply 112 is provides power to memory 114, LED 120, and radio device 112 via electrical wires, for example, which are not shown in FIG. 1.

Lighting node 110 also comprises, in one embodiment, a processor (not shown) configured to execute software to control the operation of, for example, LED 120, radio device 122, memory 114, and power supply 112.

Controller 130, depicted in FIG. 1 below lighting node 110, comprises optical sensor 140. Optical sensor 140 is configured to sense illumination provided by a lamp such as, but not limited to, LED 120. More specifically, optical sensor 140 may be configured to sense characteristics of the illumination such as brightness or color composition, for example. Further, optical sensor 140 is configured in one embodiment to receive optical communication from a lamp such as, but not limited to, LED 120. Optical sensor 140 may be implemented as, for example, a photodetector, a photodiode, a photomultiplier, or another type of optical sensor. Further, optical sensor 140 may be implemented as one optical sensor or an array of optical sensors. In one embodiment, optical sensor 140 is a directional sensor, or substantially unidirectional sensor, configured to receive input from a limited range of directions, or from one direction, respectively.

Controller 130 also comprises radio device 142, which in various embodiments includes different kinds of wireless devices. For example, in some embodiments radio device 142 is a radio transmitter for sending radio transmissions, while in other embodiments radio device 142 is a radio transceiver for sending and receiving radio transmissions. Further, radio device 142 may be implemented to operate as, for example, an analog or digital radio, a packet-based radio, an 802.11-standard radio, a Bluetooth radio, or a wireless mesh network radio. Further still, in some embodiments of the invention radio device 142 may be implemented to operate as wireline device, such as a communication-over-powerline device, a USB device, an Ethernet device, or another device for communicating over a wired medium. Radio device 142 may be configured for radio communication with radio device 122 of lighting node 110, as discussed further below.

Controller 130 also comprises memory 134, which in various embodiments includes different kinds of memory devices. For example, in some embodiments memory 134 is a volatile memory, while in other embodiments memory 134 is a nonvolatile memory. Memory 134 may be implemented as, for example, a random access memory, a sequential access memory, a FLASH memory, or a hard drive, for example. In one embodiment, memory 134 is configured to store group identifier 136 and color profile 138. In one embodiment, group identifier 136 can be configured to identify a group of lighting nodes including node 110, for example, as discussed further below.

Controller 130 also comprises power supply 132, which in various embodiments includes different kinds of power supply hardware. For example, in some embodiments power supply 132 is a battery power supply, while in other embodiments power supply 132 is coupled to an external power supply. In embodiments wherein power supply 132 is coupled to an external power supply, power supply 132 may include a transformer or other power conditioning device. Power supply 132 is provides power to memory 134, optical sensor 140, and radio device 142 via electrical wires, for example, which are not shown in FIG. 1.

Controller 130 also comprises user interface 144, which in various embodiments includes different kinds of user interface devices. For example, user interface 144 may include a simple on-off switch. Further, user interface 144 may include a single-function touch wheel or a multifunction touch wheel. A multifunction touch wheel can be configured, in one embodiment, to toggle between a dimming function, a color adjustment function, or a warmth adjustment function, for example. User interface 144 may be implemented in various embodiments as a hardware user interface (e.g., a user interface assembled from hardware components) or as a software user interface (e.g., a graphical user interface displayed on a touch sensitive display of user interface 144). User interface 144 can be utilized, for example, by a user to issue commands from controller 130 to control lighting and control system 100.

Controller 130 also comprises, in one embodiment, a processor (not shown) configured to execute software to control the operation of, for example, optical sensor 140, radio device 142, memory 134, user interface 144, and power supply 132.

Figure 2A:
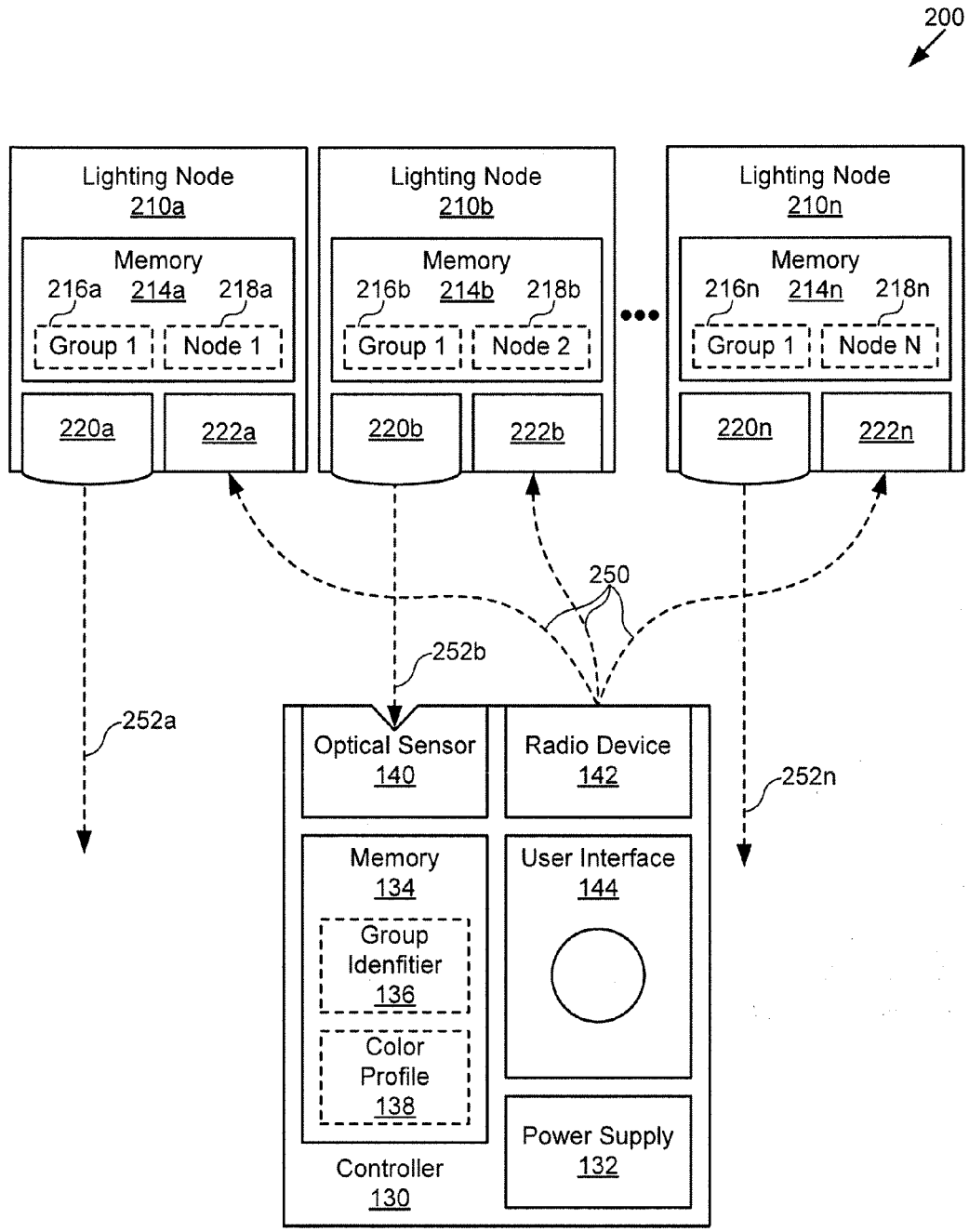
FIG. 2*a* depicts a block diagram of a lighting and control system according to an embodiment of the invention.

FIG. 2a depicts a block diagram of lighting and control system 200 according to one embodiment of the invention. Lighting and control system 200 comprises controller 130 depicted in FIG. 1. Lighting and control system 200 further comprises a plurality of lighting nodes, e.g., lighting node 210a, lighting node 210b, and lighting node 210n. One or more additional lighting nodes between lighting node 210b and lighting node 210n are omitted from FIG. 2a. The lighting nodes of FIG. 2a are collectively referred to as lighting nodes 210a through 210n. Like lighting and control system 100, lighting and control system 200 can be located in a home or other building, for example, to provide a highly configurable and precise lighting experience with fundamentally elegant user control. A user may utilize controller 130 to control lighting nodes 210a through 210n in a variety of ways.

Lighting nodes 210a through 210n each substantially correspond to lighting node 110 of FIG. 1. Power supplies for each of lighting nodes 210a through 210n have been omitted from FIG. 2a for brevity. Notably, each of lighting nodes 210a through 210n has been assigned a group number and a node number. For example, lighting node 210a is node number 1 of group number 1 (see node identifier 218a and group identifier 216a, respectively). Further, lighting node 210b is node number 2 of group number 1 (see node identifier 218b and group identifier 216b, respectively). Lighting node 210n, also belonging to group number 1, has node number "N" that is the highest node number of group number 1. For example, in a group of 4 lighting nodes, N is equal to 4.

As depicted in FIG. 2a, controller 130 has not been assigned to a group, and thus group identifier 136 is blank. According to one embodiment of the invention, a user may utilize controller 130 to assign controller 130 to a group previously assigned to a particular lighting node. For example, a user may utilize controller 130 to assign controller 130 to the group previously assigned to lighting node 210b (e.g., to group number 1). To do so, the user first utilizes controller 130 to identify node 210b.

Generally, controller 130 can be utilized to identify a particular lighting node in lighting nodes 210a through 210n in several ways. A particular lighting node can be identified utilizing, for example, a global announce method or a binary search method according to the invention. The global announce method is discussed in relation to FIG. 2a and FIG. 2b, and the binary search method is discussed in relation to FIG. 3a and FIG. 3b.

A user can utilize controller 130 to identify, for example, lighting node 210b utilizing a global announce method. To do so, the user first orients controller 130 at lighting node 210b. By doing so, optical sensor 140 is aligned to LED 220b of lighting node 210b. As described above in the discussion of FIG. 1, in one embodiment optical sensor 140 is a directional sensor, or substantially unidirectional sensor, configured to receive input from a narrow range of directions, or from one direction, respectively. Therefore, by orienting controller 130 at lighting node 210b, light subsequently emitted by LED 220b can reach optical sensor 140, but light subsequently emitted by LED 220a of lighting node 210a or emitted by LED 220n of lighting node 210n, for example, cannot.

Having oriented controller 130 at lighting node 210b, the user can utilize user interface 144 to issue a command to controller 130 to transmit global announce command 250 from radio device 142. Global announce command 250, depicted as several discrete lines in FIG. 2a, is in one embodiment a substantially omnidirectional radio broadcast. Global announce command 250 is modulated according to the particular implementation of radio device 142. Global announce command 250 is received by the respective radio devices of lighting nodes 210a through 210n. For example, radio device 222b of lighting node 210b receives global announce command 250.

After receiving global announce command 250, each of lighting nodes 210a through 210n replies by transmitting a respective global announce response. For example, lighting node 210a transmits global announce response 252a via LED 220a, and lighting node 210b transmits global announce response 252b via LED 220b. Each respective global announce response communicates the group number and node number of the transmitting lighting node. Thus, for example, global announce response 252a communicates group number 1 and node number 1. Further, global announce response 252b communicates group number 1 and node number 2.

Notably, each of lighting nodes 210a through 210n transmits a respective global announce response regardless of whether the respective LED is contemporaneously operating to provide illumination or not. For example, lighting node 210a may be unused for illumination when global announce command 250 is received, and thus LED 220a may be turned off. In such a circumstance, lighting node 210a may transmit global announce response 252a by, for example, modulating LED 220a into an on state briefly. Further, LED 220a may be modulated into an on state in a manner that is imperceptible to the user's sight, but is detectable by an optical sensor. In contrast with lighting node 210a, lighting node 210b may be providing illumination when global announce command 250 is received, and thus LED 220b may be turned on. In such a circumstance, lighting node 210b may transmit global announce response 252b by, for example, modulating LED 220b into an off state briefly. Further, LED 220b may be modulated into an off state in a manner that is imperceptible to the user's sight, but is detectable by optical sensor 140.

Notably, in one embodiment of the invention, global announce command 250 may be transmitted to request either a group number or a node number but not both. In such an embodiment, the global announce response of each lighting node would communicate only the group number of the lighting node, or only the node number of the lighting node, as appropriate.

As depicted in FIG. 2a, controller 130 has been oriented at lighting node 210b by the user. Optical sensor 140 therefore receives global announce response 252b, but not global announce response 252a or global announce response 252n. Controller 130 can thus identify lighting node 210b as having group number 1 and node number 2. Further, as stated above, controller 130 has not been assigned to a group, and thus group identifier 136 is blank. Having identified lighting node 210b, controller 130 can be assigned to group number 1. Consequently, controller 130 can be utilized to issue further commands to lighting node 210b or to all lighting nodes in group number 1, for example.

Notably, in one embodiment a second controller (not shown) can be added to lighting and control system 200 to interact with lighting nodes 210a through 210n, and with controller 130. Similarly, in one embodiment an additional lighting node (e.g., node number N+1 in group number 1, or node number 1 in group number 2, not shown) can be added to lighting and control system 200 to interact with controller 130 and lighting nodes 210a through 210n. Such an addition of a controller, of a lighting node, or of both can be accomplished without interfering with the previously extant components of lighting and control system 200.

Figure 2B:
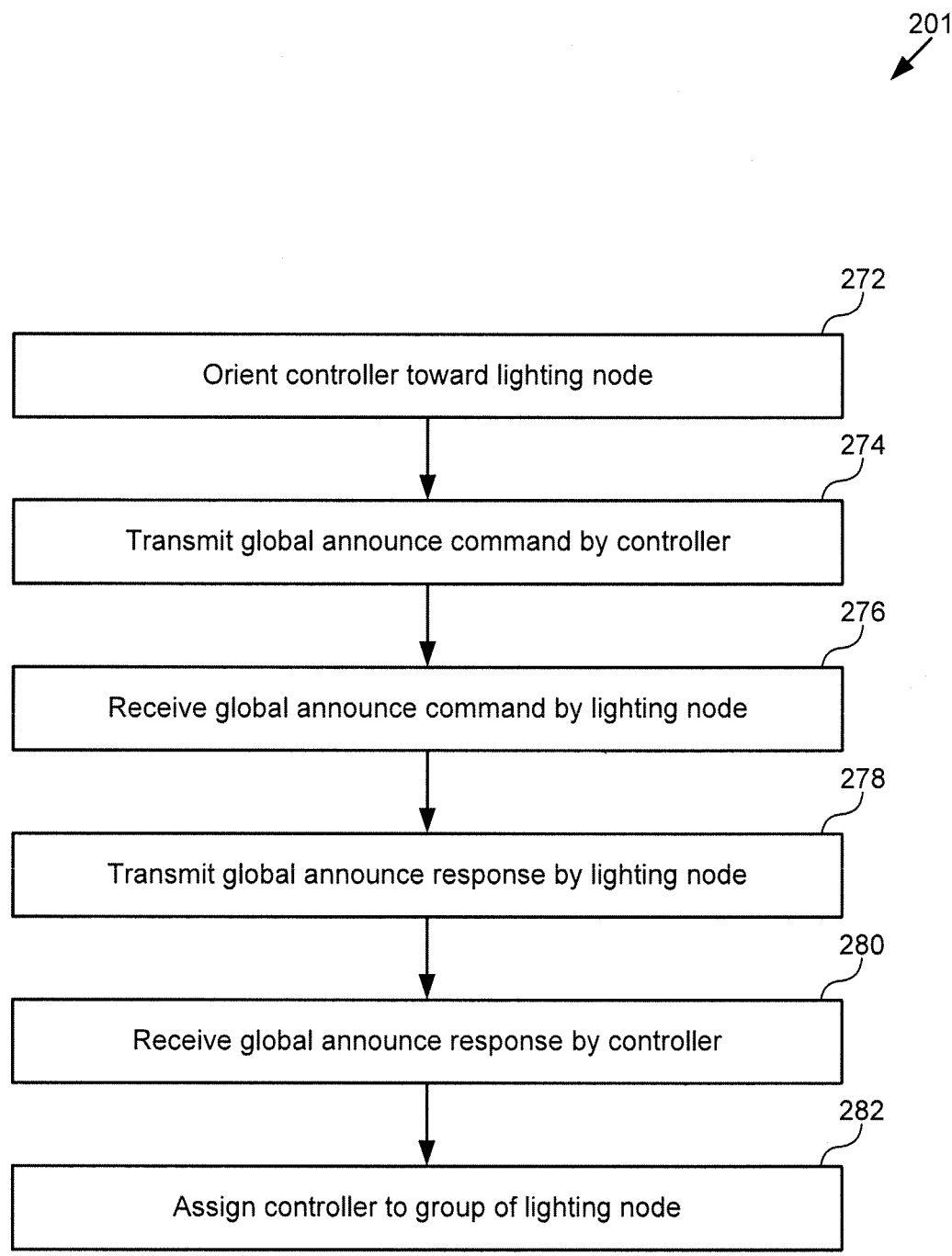
FIG. 2*b* depicts a flowchart of a method for lighting and control according to an embodiment of the invention.

FIG. 2b depicts flowchart 201 of a method for lighting and control. Specifically, flowchart 201 shows a method of assigning a controller to a group previously assigned to a lighting node, according to one embodiment. In particular, flowchart 201 depicts the method utilizing a global announce method as discussed in FIG. 2a. The method includes orienting the controller toward the lighting node, transmitting a global announce command by the controller, receiving the global announce command by the lighting node, transmitting a global announce response by the lighting node, receiving the global announce response by the controller, and assigning the controller to the group of the lighting node.

As discussed above, controller 130 can be utilized to identify a particular lighting node in lighting nodes 210a through 210n utilizing, for example, a global announce method. A global announce method has an advantage, in one embodiment, of being a high-speed method, which can generally be accomplished in constant time regardless of the number of lighting nodes. Having discussed a global announce method in relation to FIG. 2a and FIG. 2b, a binary search method is discussed in relation to FIG. 3a and FIG. 3b below. A binary search method has an advantage, in one embodiment, of being a low-energy method, which can be performed with very low energy cost even with an increasing number of lighting nodes.

Figure 3A:
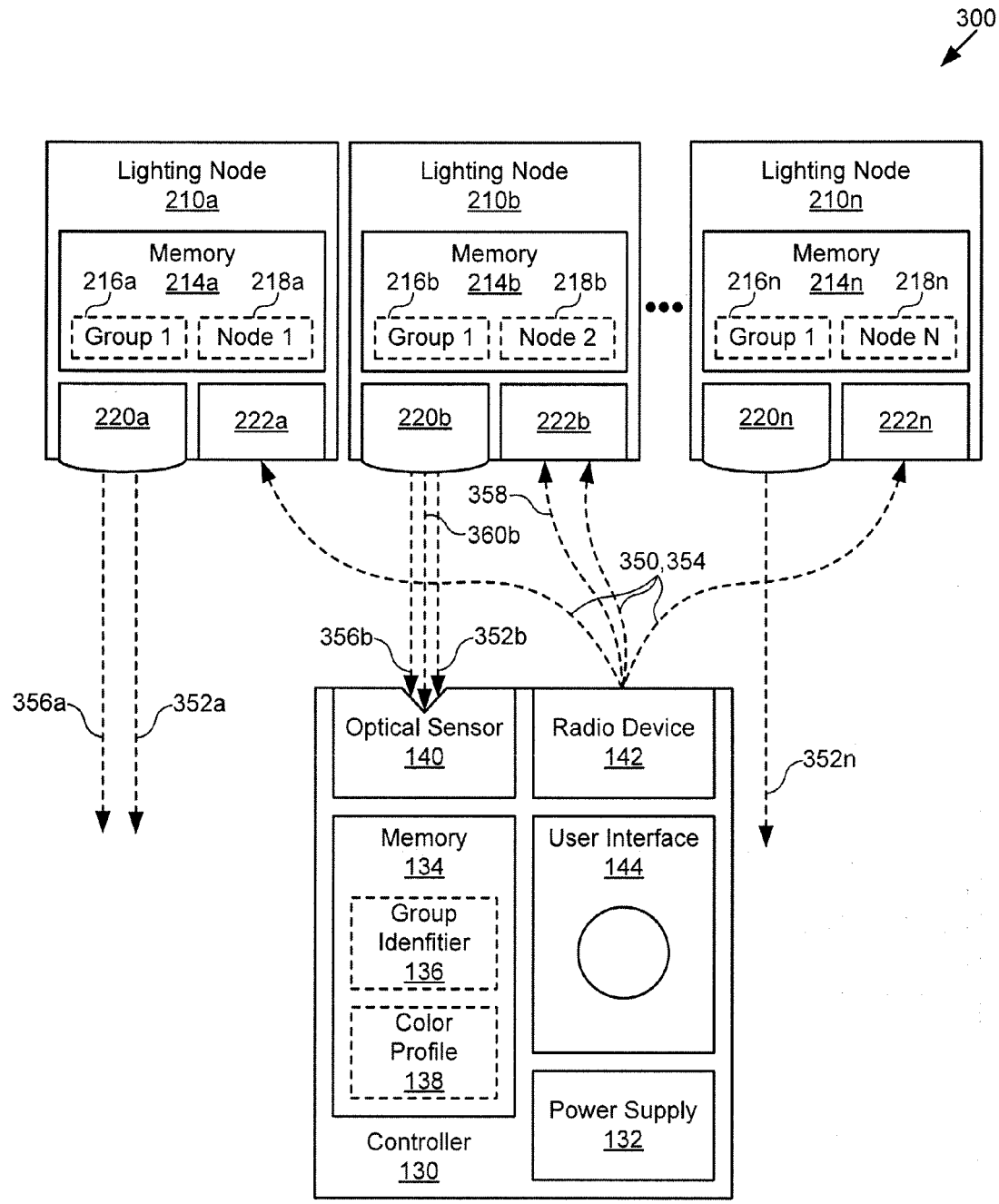
FIG. 3*a* depicts a block diagram of a lighting and control system according to an embodiment of the invention.

FIG. 3a depicts a block diagram of lighting and control system 300 according to one embodiment of the invention. Lighting and control system 300 comprises controller 130 depicted in FIG. 1 and FIG. 2a, as well as lighting node 210a through 210n depicted in FIG. 2a. As was the case in FIG. 2a, as depicted in FIG. 3a controller 130 has not been assigned to a group, and thus group identifier 136 is blank. A user may utilize controller 130 to assign controller 130 to a group previously assigned to a particular lighting node utilizing a binary search method.

A user can utilize controller 130 to identify, for example, lighting node 210b utilizing a binary search method. To do so, the user first orients controller 130 at lighting node 210b. By doing so, optical sensor 140 is aligned to LED 220b of lighting node 210b. Then, the user can utilize user interface 144 to issue a command to controller 130 to transmit binary search command 350 from radio device 142. Binary search command 350, depicted as several discrete lines in FIG. 3a, is in one embodiment an substantially omnidirectional radio broadcast. Binary search command 350 is modulated according to the particular implementation of radio device 142. Binary search command 350 is received by the respective radio devices of lighting nodes 210a through 210n.

Binary search command 350 varies from global search command 250 depicted in FIG. 2a, which was, in one embodiment, a command to each of lighting nodes 210a through 210n to transmit respective group numbers and node numbers in response. In contrast, binary search command 350 is a command to a first half of lighting nodes 210a through 210n to transmit a first code (e.g., a 0), and a command to a second half of lighting nodes 210a through 210n to transmit a second code (e.g., a 1). The halves of lighting nodes 210a through 210n are determined by, for example, ranges of node numbers. Thus, for example, lighting nodes having a node number between 1 and N/2 will transmit a 0, and lighting nodes having a node number between N/2+1 and N will transmit a 1. Specifically, if N is equal to 4, lighting node 210a and lighting node 210b will transmit a 0, and a third lighting node and lighting node 210n will transmit a 1.

In response to binary search command 350, lighting node 210a and lighting node 210b transmit binary search response 352a and binary search response 352b, respectively, each communicating a 0, while lighting node 210n (being in the upper half of the node number range) transmits binary search response 352n containing a 0.

As depicted in FIG. 3a, controller 130 has been oriented at lighting node 210b by the user. Optical sensor 140 therefore receives binary search response 352b containing a 0, but not binary search response 352a or binary search response 352n. Controller 130 can subsequently exclude the half of lighting nodes 210a through 210n having the upper range of node numbers. Further, controller 130 can determine that lighting node 210b must have a node number between 1 and N/2, instead of a node number between N/2 and N. Notably, if N were equal to 2, then controller 130 could uniquely identify lighting node 210b at this stage. However, since N is larger, in the example of FIG. 3a, controller 130 must repeat the binary search method to halve the range again and exclude additional lighting nodes from the search.

Therefore, controller 130 automatically transmits binary search command 354 from radio device 142. Binary search command 354 propagates to lighting nodes 210a through 210n in the same manner as binary search command 350, and is received by the respective radio devices of lighting nodes 210a through 210n. Binary search command 354 varies from binary search command 350. In particular, binary search command 354 is a command to only the first half of lighting nodes 210a through 210n, commanding a first half of that half to transmit a first code (e.g., a 0), and a second half of that half to transmit a second code (e.g., a 1). The halves of lighting nodes 210a through 210n are determined by, for example, ranges of node numbers. Thus, for example, lighting nodes having a node number between 1 and N/4 will transmit a 0, and lighting nodes having a node number between N/4+1 and N/2 will transmit a 1.

Accordingly, lighting node 210a transmits binary search response 356a, communicating a 0, and lighting node 210b transmits binary search response 356b, communicating a 1. Notably, lighting node 210n (and any other lighting node in the upper half of the node number range) does not transmit a binary search response in response to binary search command 354. Optical sensor 140 receives binary search response 356b containing a 1, but not binary search response 356a. Controller 130 can thus uniquely identify lighting node 210b as the lighting node that transmitted binary search response 356b, and thus must be the lighting node having node number 2.

To then assign controller 130 to a group previously assigned to lighting node 210b, controller 130 transmits group identifier request command 358 specifically addressed to lighting node 210b having node number 2, asking for a group number. Lighting node 210a and lighting node 210n do not transmit a response because neither has node number 2. Lighting node 210b responds with group identifier response 360b, communicating group number 1. Controller 130 may then be assigned to group number 1. Consequently, controller 130 can be utilized to issue further commands to lighting node 210b or to all lighting nodes in group number 1, for example.

Figure 3B:
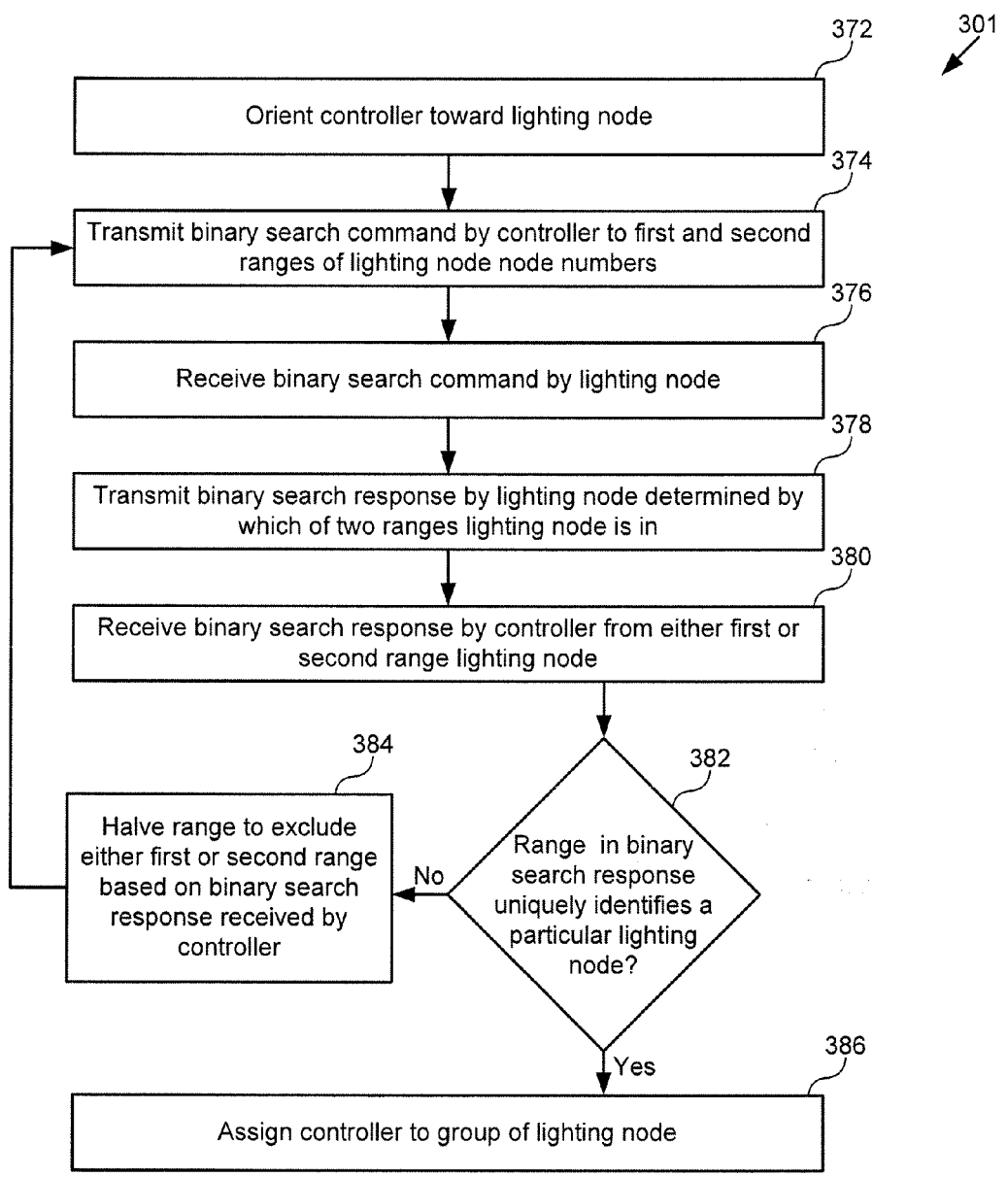
FIG. 3*b* depicts a flowchart of a method for lighting and control according to an embodiment of the invention.

FIG. 3b depicts flowchart 301 of a method for lighting and control. Specifically, flowchart 301 shows a method of assigning a controller to a group previously assigned to a lighting node, according to one embodiment. In particular, flowchart 301 depicts the method utilizing a binary search method as discussed in FIG. 3a. The method includes orienting the controller toward the lighting node, transmitting a binary search command by the controller to the first and second ranges of the lighting nodes according to their node numbers. The method also includes receiving the binary search command by the lighting node and transmitting a binary search response by the lighting node determined by which of the two ranges the lighting node is in. The method further includes receiving the binary search response by the controller from the lighting node in either the first or second range of node numbers, and determining whether the range of node numbers in the binary search response uniquely identifies the particular lighting node. If not, the method repeats after halving the range to exclude either the first or second range of node numbers based on the binary search response received by controller. If so, the method concludes by assigning the controller to the group of the lighting node.

Figure 4:
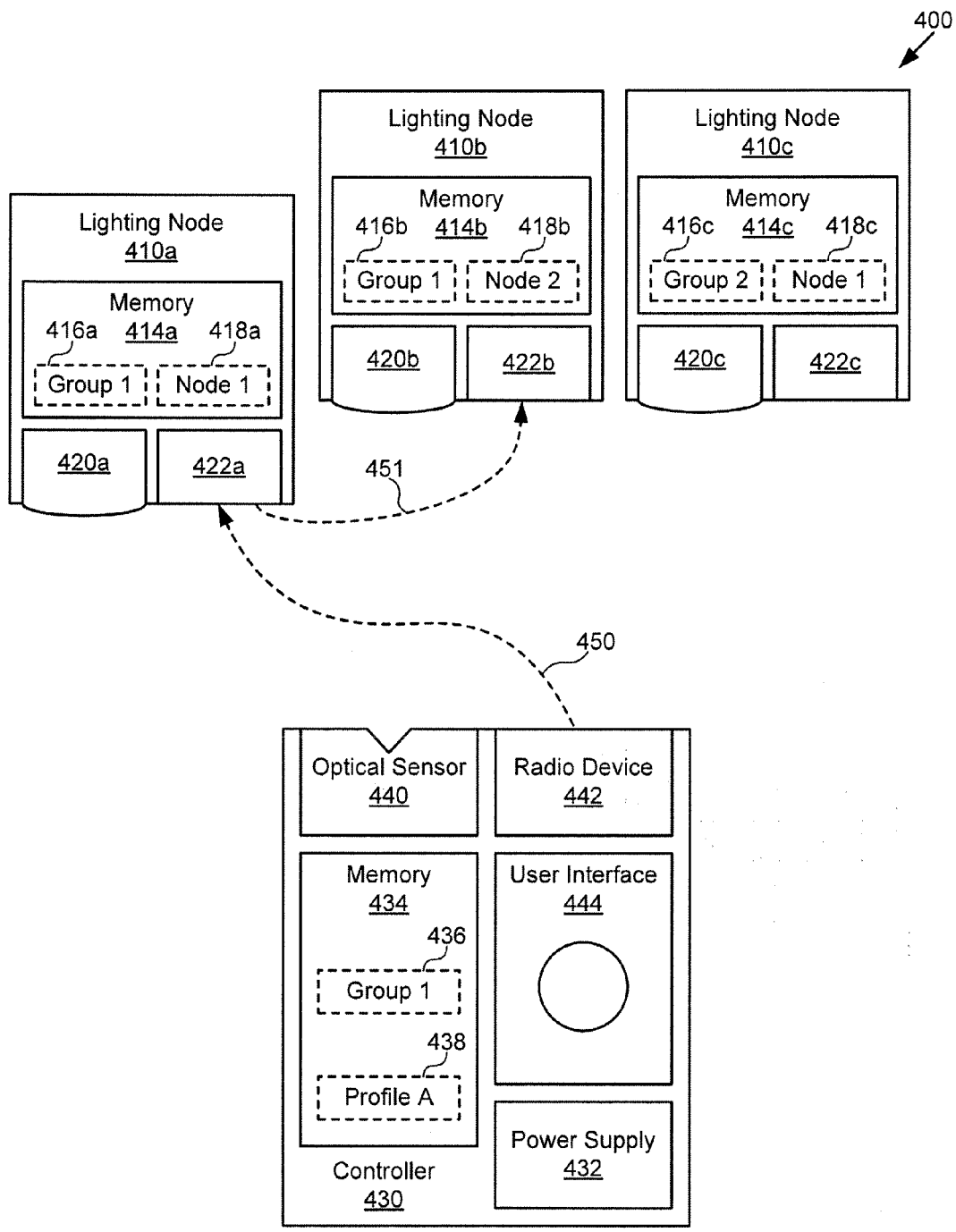
FIG. 4 depicts a block diagram of a lighting and control system according to an embodiment of the invention.

FIG. 4 depicts a block diagram of lighting and control system 400 according to one embodiment of the invention. Lighting and control system 400 comprises controller 430, lighting node 410a, lighting node 410b, and lighting node 410c. Like lighting and control system 100, lighting and control system 400 can be located in a home or other building, for example, to provide a highly configurable and precise lighting experience with fundamentally elegant user control. A user may utilize controller 430 to control lighting node 410a, lighting node 410b, and lighting node 410c (collectively "lighting nodes 410a through 410c") in a variety of ways.

Lighting nodes 410a through 410c each substantially correspond to lighting node 110 of FIG. 1. Lighting node 410a is node number 1 of group number 1, lighting node 410b is node number 2 of group number 1, and lighting node 410c is node number 1 of group number 2. As depicted in FIG. 4, controller 130 has been assigned to group 1. As further depicted in FIG. 4, controller 130 has stored Profile A in color profile 438.

Controller 430 can be utilized to identify a particular lighting node in lighting nodes 410a through 410c utilizing, for example, a global announce method or a binary search method as discussed above in relation to FIG. 2a, FIG. 2b, FIG. 3a, and FIG. 3b, for example. Also, controller 430 can be utilized by a user for further control of lighting nodes 410a through 410c.

FIG. 4 depicts controller 430 transmitting command 450 to lighting node 410a. Command 450 may be a binary search command or a global announce command as discussed above, or another kind of command. Notably, command 450 cannot reach lighting node 410b. This may be the case in one embodiment because, for example, lighting node 410b is too far from controller 430, or because, for example, of radio-frequency interference. Because command 450 cannot reach lighting node 410b, lighting node 410a forwards command 450 to lighting node 410b as command 451. Lighting node 410b has this capability because, for example, the distance to lighting node 410b is lower or, for example, the radio-frequency interference has ended. Lighting node 410a can be configured to perform this forwarding by, for example, utilizing a repeater technique or by, for example, implementing a mesh networking technique.

Notably, neither command 450 nor command 451 is transmitted to lighting node 410c, because while controller 430, lighting node 410a, and lighting node 410b are in group number 1, lighting node 410c is in group number 2. Lighting node 410c may be assigned to group number 2 because, for example, in one embodiment lighting node 410c is located in a home or other building separate from the home or other building of the balance of lighting and control system 400 (in other words, in such an embodiment lighting node 410c could be part of a separate lighting and control system having different group numbers to avoid interference).

Further operations of lighting and control system 400 according to the invention can be described with respect to the embodiment of FIG. 4. For example, controller 430 can be utilized for color calibration of illumination provided by lighting nodes 410a through 410c. In particular, controller 430 can be oriented toward lighting node 410b, for example, to perform color coordinate/color temperature set point adjustment via command 450 and command 451 and utilizing feedback from LED 420b into optical sensor 440. Further, controller 430 can be oriented toward first lighting node 410a and then 410b in sequence, for example, to automatically calibrate LED 420a and LED 420b to match each other, or to vary in a desired manner. Further still, controller 430 can be utilized to "copy" some or all of the illumination or control characteristics of a first set of lighting nodes, and then to "paste" those characteristics to a second set of lighting nodes.

Similarly, controller 430 can measure the individual RGB ("Red, Green, Blue")/White output of LED 420b, for example, and recalibrate LED 420b as the output of the individual LEDs changes, utilizing Profile A stored in color profile 438. A user may initially calibrate (e.g., by transmitting a first calibrate command) the illumination of LED 420b to match Profile A utilizing feedback from optical sensor 440. Subsequently, the illumination of LED 420b may decalibrate as time passes, or as the temperature of LED 420b changes, or as environmental conditions change, for example, and the output of the individual LEDS may change. After such a change occurs, the user may recalibrate (e.g., by transmitting a second calibrate command) the illumination of LED 42b to match Profile A again, by again utilizing feedback from optical sensor 440.

In one embodiment, controller 430 can perform background automatic calibration of lighting node 410b, for example, while a user is utilizing controller 430 to control lighting node 410b in another manner. For example, controller 430 can perform background automatic calibration of LED 420b (e.g., to compensate for decalibration of LED 420b after the passage of time) while a user is utilizing controller 430 to control the overall brightness of lighting node 410b. With this and other background automatic controls, controller 430 can relieve a user of certain management duties.

In a further operation of lighting and control system 400, controller 430 can be utilized to relay commands or other information into lighting and control system 400 from, for example, external systems in the building or locale of lighting and control system 400. For example, controller 430 can be configured to relay commands or information from occupancy sensors, programmable light controllers, fire alarms, smoke alarms, burglar alarms, desktop computers, or server computers, for example. In one embodiment, controller 430 has a dedicated interface (not shown) to the external system, while in another embodiment radio device 442 is configured to communicate with the external system. Notably, the further operations discussed herein with respect to the embodiment of FIG. 4 can also be utilized in lighting and control system 300 of FIG. 3a, in lighting and control system 200 of FIG. 2a, and in lighting and control system 100 of FIG. 1.

Figure 5:
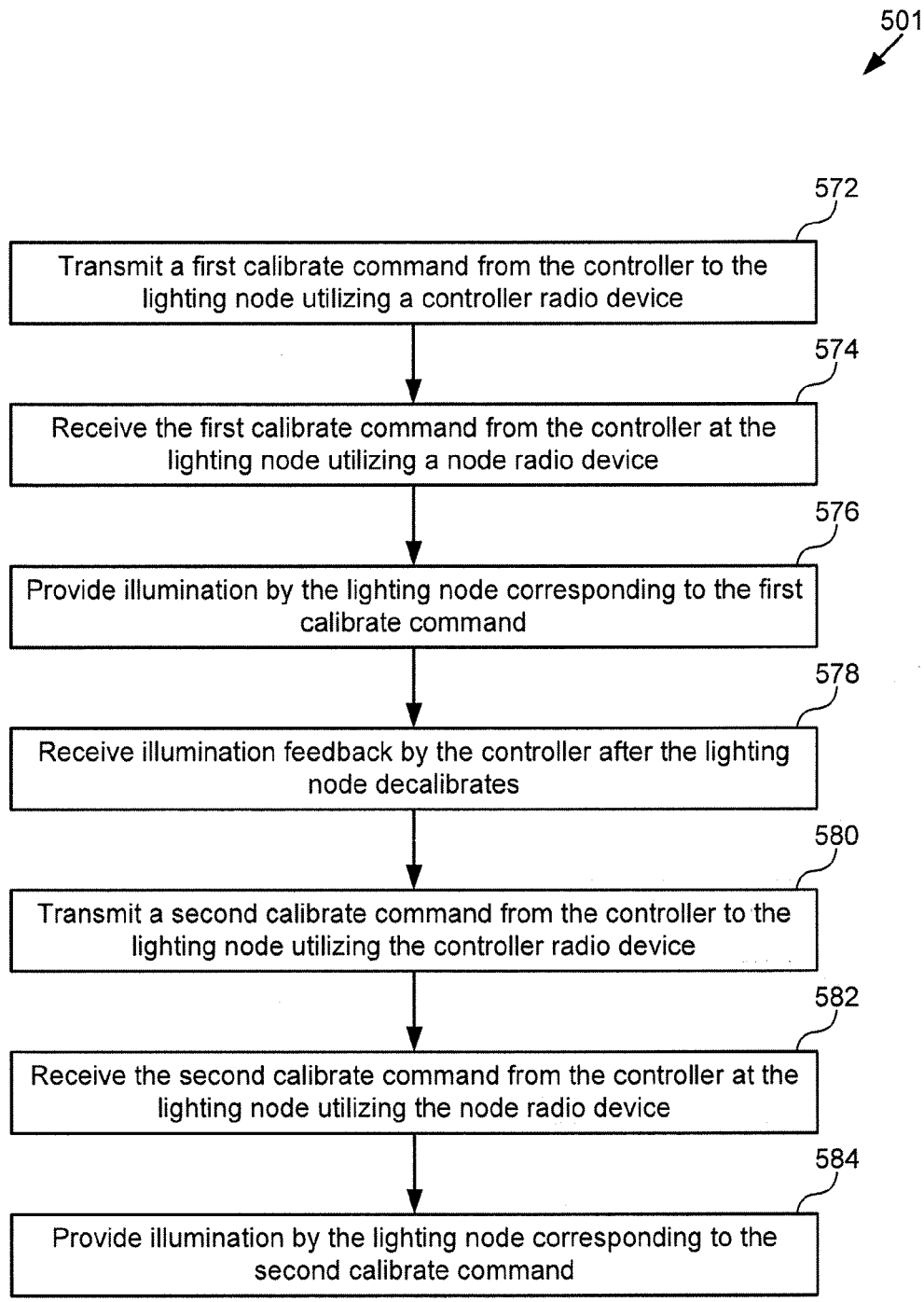
FIG. 5 depicts a flowchart of a method for lighting and control according to an embodiment of the invention.

FIG. 5 depicts flowchart 501 of a method for lighting and control. Specifically, flowchart 501 shows a method for calibrating a lighting node utilizing a controller, according to one embodiment. The method includes transmitting a first calibrate command from the controller to the lighting node utilizing a controller radio device, receiving the first calibrate command from the controller at the lighting node utilizing a node radio device, and providing illumination by the lighting node corresponding to the first calibrate command. The method further includes receiving illumination feedback by the controller after the lighting node decalibrates, transmitting a second calibrate command from the controller to the lighting node utilizing the controller radio device, receiving the second calibrate command from the controller at the lighting node utilizing the node radio device, and providing illumination by the lighting node corresponding to the second calibrate command.

Figure 6:
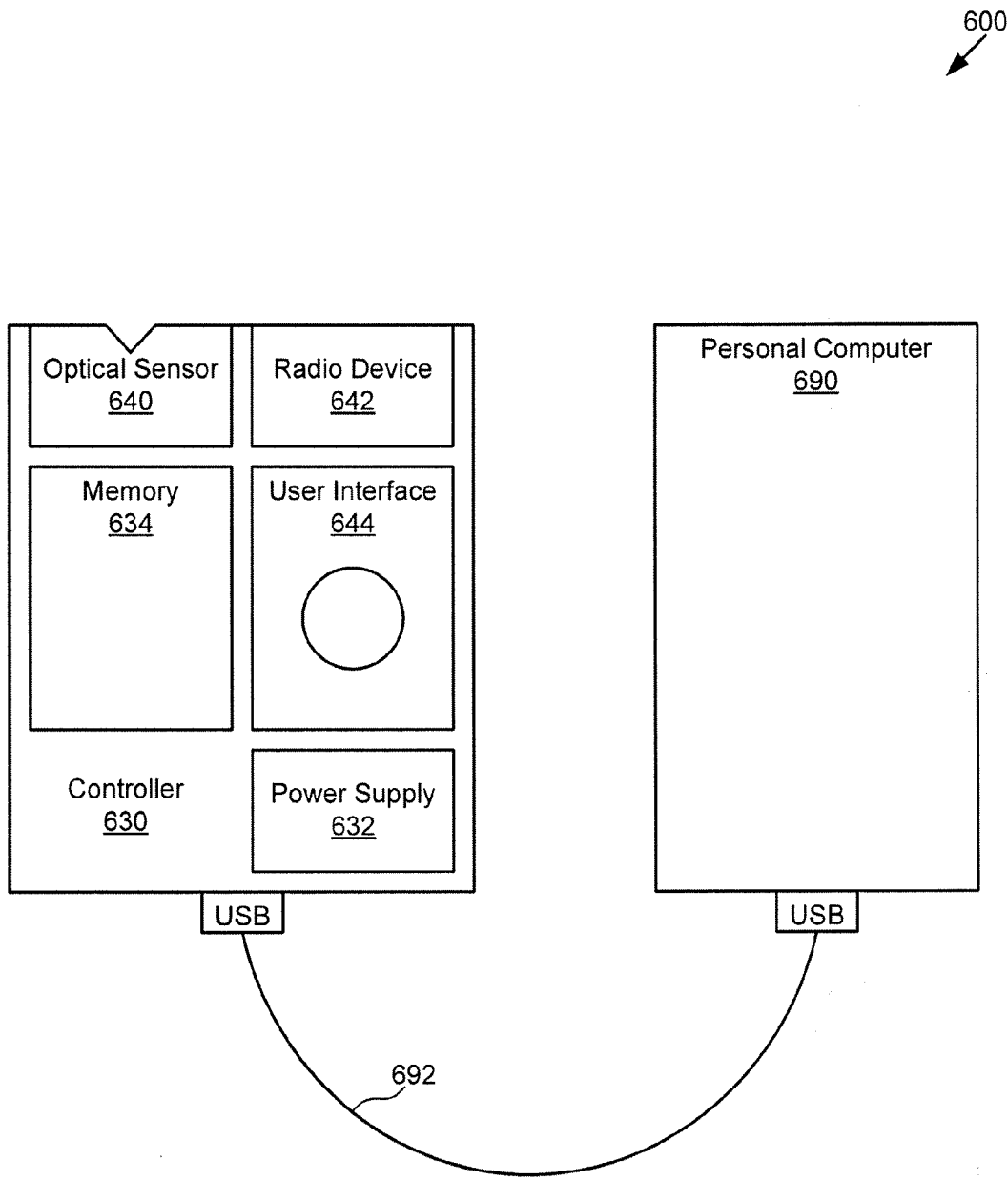
FIG. 6 depicts a block diagram of a lighting and control system according to an embodiment of the invention.

FIG. 6 depicts a block diagram of lighting and control system 600 according to one embodiment of the invention. Lighting and control system 600 comprises controller 630, personal computer 690, and one or more lighting nodes (not shown). Like lighting and control system 100, lighting and control system 600 can be located in a home or other building, for example, to provide a highly configurable and precise lighting experience with fundamentally elegant user control.

The lighting nodes of lighting and control system 600 each substantially correspond, in one embodiment, to lighting node 110 of FIG. 1. Controller 630 can be utilized to identify a particular lighting node, and for further control of the lighting nodes as described above. In one embodiment, controller 630 can be configured to relay commands or information from personal computer 690 to the lighting nodes. Further, in one embodiment controller 630 can provide information regarding lighting and control system 600 to personal computer 690 (e.g., information about calibrations performed on various lighting nodes). Additionally, personal computer 690 can be used to program memory 634 of controller 630 (e.g., to provide a new color profile, or to provide a firmware update). Controller 630 can be configured to communicate with personal computer 690 via USB connector 692. USB connector 692 can also be configured for charging power supply 632 (e.g., charging a battery) of controller 630. In another embodiment, controller 630 has a different interface to personal computer 690, such as a serial interface, a Firewire interface, a Bluetooth interface, or another wired or wireless interface.

Personal computer 690 can provide enhanced control for lighting and control system 600. For example, in one embodiment personal computer 690 can be configured with software to provide a user interface with more features than, for example, user interface 644. Additionally, personal computer 690 can be configured to provide remote management of lighting and control system 600 via the Internet, for example.

The words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The foregoing description of various embodiments of the claimed subject matter has been provided for the purposes of illustration and description. It is not intended to be exhaustive or to limit the claimed subject matter to the precise forms disclosed. Many modifications and variations will be apparent to the practitioner skilled in the art. Embodiments were chosen and described in order to best describe the principles of the invention and its practical application, thereby enabling others skilled in the relevant art to understand the claimed subject matter, the various embodiments and with various modifications that are suited to the particular use contemplated.

The teachings of the invention provided herein can be applied to other systems, not necessarily the system described above. The elements and acts of the various embodiments described above can be combined to provide further embodiments.

While the above description describes certain embodiments of the invention, and describes the best mode contemplated, no matter how detailed the above appears in text, the invention can be practiced in many ways. Details of the system may vary considerably in its implementation details, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

What is claimed is:

1. A method of configuring a lighting system comprising:
driving light emitters of different colors to produce an illumination experience, the light emitters in a lighting node;
detecting a color composition from the light emitters via a remote optical sensor on a remote control device;
comparing the color composition with a color profile stored on a memory of the remote control device; and
adjusting at least one of the light emitters until the detected color composition substantially matches the color profile,
wherein the adjusting is based on a re-calibration command sent from the remote control device; and wherein the color profile is based on a previous color adjustment command sent from the remote control device wherein, since the previous color adjustment command is last sent, the illumination experience produced by the light emitters having de-calibrated.

2. The method of claim 1, further comprising:
capturing a target spectrum content via the remote optical sensor; and
storing the color profile on the memory of the remote control device based on the target spectrum content.

3. The method of claim 2, wherein the target spectrum content is captured while the remote optical sensor is aligned to the light emitters of the lighting node.

4. The method of claim 2, wherein the target spectrum content is captured while the remote optical sensor is aligned to another light source different from the lighting node.

5. The method of claim 1, wherein the illumination experience is a uniform spectrum.

6. The method of claim 1, wherein the light emitters include light emitting diodes (LEDs).

7. The method of claim 1, wherein detecting the color composition includes determining a color intensity ratio of one color over another color.

8. The method of claim 1, wherein detecting the color composition via the remote optical sensor includes aligning the remote optical sensor, which is a substantially unidirectional sensor, at the illumination experience produced by the light emitters.

9. The method of claim 1, further comprising:
  modulating the at least one of the light emitters between on and off states; and
  detecting the color composition of the at least one of the light emitters at an on state.

10. The method of claim 1, further comprising:
  receiving a node identifier from the lighting node; and
  generating the re-calibration command based on the color profile corresponding to the node identifier.

11. A method comprising:
  generating an illumination with a plurality of light-emitting diodes (LEDs) at a lamp, wherein the illumination is user-controlled to provide a configurable lighting experience, and further wherein a spectral content of the illumination is communicated by the illumination to a sensor;
  sensing by the sensor the spectral content of the illumination;
  storing in a memory a color profile to be targeted by the illumination generated by the LEDs;
  transmitting a command to the lamp to adjust an output of the LEDs for the generated illumination to target the color profile; and
  receiving the command at the lamp;
  adjusting the output of the LEDs to target the color profile;
  wherein the sensor and memory are physically separate from the LEDs; wherein the adjusting is based on a re-calibration command; wherein the color profile is based on a previous color adjustment command sent; and wherein, since the previous color adjustment command is last sent, the generated illumination produced by the LEDs having de-calibrated.

12. The method of claim 1, further comprising receiving the re-calibration command from the remote control device via Bluetooth.

* * * * *